United States Patent
Hunter et al.

(10) Patent No.: US 8,156,423 B1
(45) Date of Patent: Apr. 10, 2012

(54) METHOD AND SYSTEM FOR DYNAMICALLY UPDATING FIXED RESOURCES ON CLIENT STATION

(75) Inventors: Kevin E. Hunter, Olathe, KS (US); Balaji S. Thenthiruperai, Overland Park, KS (US); Scott A. Papineau, Shawnee Mission, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2108 days.

(21) Appl. No.: 10/978,772

(22) Filed: Nov. 1, 2004

(51) Int. Cl.
*G06F 17/24* (2006.01)
*G06F 7/14* (2006.01)

(52) U.S. Cl. ........ 715/234; 715/241; 715/243; 715/248; 715/249; 715/250; 709/201

(58) Field of Classification Search .................. 715/500, 715/513, 234, 241, 243, 248, 249, 250; 707/100, 707/10, 200; 709/201
See application file for complete search history.

(56) References Cited

U.S. PATENT DOCUMENTS

| | | | |
|---|---|---|---|
| 4,907,149 A * | 3/1990 | Gula et al. | 710/264 |
| 5,991,760 A * | 11/1999 | Gauvin et al. | 707/10 |
| 6,377,957 B1 * | 4/2002 | Jeyaraman | 707/200 |
| 6,469,723 B1 * | 10/2002 | Gould et al. | 715/837 |
| 6,606,604 B1 * | 8/2003 | Dutta | 705/26 |
| 6,785,707 B2 * | 8/2004 | Teeple | 709/203 |
| 6,941,310 B2 * | 9/2005 | Ahad et al. | 707/100 |
| 2005/0138138 A1 * | 6/2005 | Jelinek et al. | 709/217 |
| 2006/0122844 A1 * | 6/2006 | Dangberg | 705/1 |

* cited by examiner

*Primary Examiner* — Stephen Hong
*Assistant Examiner* — Wilson Tsui

(57) ABSTRACT

An intermediary such as a gateway will intercept a markup document being sent in a response message from a web server to a client station and will determine that the client station does not have stored locally the set of objects necessary to render the markup document. The intermediary will then modify the response message to include both the markup document and the necessary set of objects. Upon receipt of the response, the client station will extract and store the objects as non-cached objects, to be used when rendering the markup document. Preferably the client station is a cell phone.

7 Claims, 9 Drawing Sheets

| DEVICE-ID | OBJECT-SET VERSION |
|---|---|
| 36 | 1.0 |
| X | 2.0 |
| Y | 2.0 |

FIG. 5

```
GET http://www.sprintpcs.com/ HTTP/1.0
x-wap-pict-version: 1.0

HTTP/1.1 200 OK
Date: Mon, 18 Oct 2004 21:25:46 GMT
Server: Apache/1.3.29 (Unix) mod_jk/1.2.5 PHP/4.3.4 mod_ssl/2.8.16
OpenSSL/0.9.61
x-wap-pict-version: 2.0
Connection: close
Content-Type: text/html <?xml version="1.0" encoding="iso-8859-1"?>
<!DOCTYPE html PUBLIC "-//OPENWAVE//DTD XHTML Mobile 1.0//EN"
"http://www.openwave.com/dtd/xhtml-mobile10.dtd">
<html xmlns="http://www.w3.org/1999/xhtml">
   <head>
   <title>
      Site
   </title>
   </head>
   <body>
      <div>
         <img src="pict:///custom/newhome.png" alt="Home"/>
      </div>
      <hr/>

<dl>
         <dt>
            1.<img src="pict:///custom/ent.png" alt="Enter" />
            <a href="/entertainmemnt.html" accesskey="1">
               Entertainment
            </a>
         </dt>
      </dl>
   </body>
</html>
```

Fig. 9

```
GET http://www.sprintpcs.com/ HTTP/1.0
x-wap-pict-version: 1.0

HTTP/1.1 200 OK
Date: Mon, 18 Oct 2004 21:25:46 GMT
Server: Apache/1.3.29 (Unix) mod_jk/1.2.5 PHP/4.3.4 mod_ssl/2.8.16
OpenSSL/0.9.61
x-wap-pict-version: 2.0
Connection: close
Content-Type: multipart/related;boundary="_----------=_109631869859840"

--_----------=_109631869859840
Content-Type: text/html

<?xml version="1.0" encoding="iso-8859-1"?>
<!DOCTYPE html PUBLIC "-//OPENWAVE//DTD XHTML Mobile 1.0//EN"
"http://www.openwave.com/dtd/xhtml-mobile10.dtd">
<html xmlns="http://www.w3.org/1999/xhtml">
    <head>
    <title>
        Site
    </title>
    </head>
    <body>
        <div>
            <img src="pict:///custom/newhome.png" alt="Home"/>
        </div>
        <hr/>

<dl>
            <dt>
                1.<img src="pict:///custom/ent.png" alt="Enter" />
                <a href="/entertainmemnt.html" accesskey="1">
                    Entertainment
                </a>
            </dt>
        </dl>
    </body>
</html>

--_----------=_109631869859840
Content-Transfer-Encoding: base64
Content-Type: image/png
Content-location: pict:///custom/newhome.png
x-content-localstore: <value> iVBORw0KGgoAAAANSUhEUgAAAGIAAAATCAMAAABcBShYAAAABGdBTUEAANbY
1E9YMgAAAB10RVh0U29mdHdhcmUUAQWRvYmUgSW1hZ2VSZWFkeXHJZTwAAABm
UExURRcwAAP///wAAAP325szMzP378ujOZsiGKtajKuO/TNGxPTIyMvft1VBQ
UO/ZjoGDhefn5/T09MuaLGZmZunmxri4ufHx8bSwt5qamry9wMqZLOPew/Ds
zP/yrdrZ2XBub/r8/cnFyCT34CwAAAFPSURBVHjaYmCgOQAIIAYGRnRAbQsA
AghmhRgvr7AgIyMTDawACCoFYrc8uzC3HI0sQIggCBW8DOJswtxSTDRxAqA
AAJZIcDLzczOzsHJxsLIpEB9KwACCGiFKDc/yAYuNj5pGUYmAbAVYIuABMJC
bFaDxAg7CSCAgGp4JZkRgJ8JxQpCAUCMFFQABBI4LJiQgyAjTDTMAkpCRWbAI
wybOCHUdwmqAAALxmJiBcc3GxyfCw8yKpBtqAIJCFWCApXd0cRQlQAAQQBAr
pDg4gYYEkC7SCCYsVyBGDZgU2cageuBUAAQSxApiagGHEjNUKqK9JtAIpJgAC
CGYFEwsLCxMzwgoGLG4nzQq4NQABBLGGCiwloNA4rsEQ3mhVo4ggRCAAIIIgV
nJhWUA8ABBDEmaIFSI8tLACIIBg+QLkMxYITWOLAAKIDvUFQADRAQEEGACn
PwZU6S5wdgAAAABJRU5ErkJggg==
--_----------=_109631869859840--
```

Fig. 10

METHOD AND SYSTEM FOR DYNAMICALLY UPDATING FIXED RESOURCES ON CLIENT STATION

FIELD OF THE INVENTION

The present invention relates to telecommunications and, more particularly, to delivery and rendering of content on client stations. The invention is particularly useful in the context of delivering web content to wireless handsets such as cell phones, but the invention could equally extend to apply in other scenarios as well, including landline communications and other sorts of wireless communications. For simplicity, this disclosure will focus on the wireless embodiment and particularly the cell phone embodiment.

BACKGROUND

It is well known today that a wireless handset such as a cell phone can be equipped with a web browser to support requesting, receiving and rendering of web content. Like PC-based browsers, a typical cell phone browser will use HTTP messaging or some variant of HTTP messaging to request and receive web content. For instance, the browser may send to a web server an HTTP GET request specifying desired content and may then receive from the web server an HTTP 200 OK request carrying the requested content.

In many cases, the content returned by the web server will comprise an HTML markup document or the like, which may include text, object-references, and formatting directives, among other elements. Each object-reference will typically point to an image file, music file, multimedia file (e.g., audio/video file) or other object at a particular location specified by a Universal Resource Indicator (URI). When the browser receives the markup document, the browser will then automatically respond to each such object reference by sending a respective secondary HTTP request or the like, in order to download the referenced object for presentation to a user. The browser will then present the text and objects in the manner indicated by the markup.

To speed up rendering of frequently accessed content, most browsers are also arranged to cache referenced objects in local data storage. Each time the browser receives a referenced object, the browser may store the object in its local cache, typically with an indication of the URI from which it was obtained, and typically with an expiration timer. When the browser receives a markup document that references an object the browser has cached (i.e., from the same URI), the browser may then conveniently use the cached copy of the object rather than having to download a new copy of the object. When the expiration timer for a given cached object expires, the browser may automatically delete the object from cache, to conserve storage space. Thereafter, if the browser receives a markup document that references the object, the browser would again download the object for presentation to a user.

When a web server sends an object such as an image file to browser, the server typically provides the object in binary form within the body of an HTTP 200 OK message, including a MIME ("Multipurpose Internet Mail Extension") header that specifies the content type. Based on the content type indicated in the MIME header, the browser can then invoke applicable logic to render the object for presentation. For instance, if the object is a JPEG image file, the browser can invoke logic to render the file as an image on a display screen.

Many browsers are also capable of receiving and rendering web content that arrives in the form of a multi-part MIME package. Most commonly used for HTML-based e-mail messaging, a multi-part MIME package may include a root part that contains a markup document, and then one or more other parts that each contain a respective object having a designated MIME content type indicated by a MIME header. For instance, one part may contain one image file, and another part may contain another image file, while yet another part may contain another sort of object, and so forth. When a browser receives such a package, the browser may render the content as indicated by the primary markup document, which may include presenting the included objects.

In certain client stations, it is also highly desirable to more permanently store certain objects, such as image files, to be presented when rendering web content. In a cell phone that is arranged to frequently access particular web pages, for instance, it is desirable to more permanently store a set of objects that will need to be presented when rendering those particular web pages. That way, the cell phone will not have to download the objects or cache the objects, and no risk would exist that the objects would expire and be deleted from cache.

By way of example, assume that a wireless carrier maintains a home page to which cell phones issued by the carrier are programmed to browse. Assume further that the home page includes the carrier's logo and certain other graphical image elements, such as fanciful button images for instance. To facilitate quick rendering of the home page, and to avoid unnecessary wireless data transmission (which can be costly), the carrier may pre-provision all of its subscribers' cell phones with the necessary image files. That is, the carrier (or a manufacturer or vendor of the cell phones) may load the image files into a defined storage location on each cell phone. (Since these objects are not cached in the traditional browser sense but are rather stored in a more fixed manner, the objects may be considered "non-cached objects." Non-cached image files may also be referred to as "pictograms.")

The carrier can then design its home page HTML document to point to locally-stored objects rather than to network-based versions of the objects. For instance, where the home page HTML document references the carrier's logo image, it may do so with a URI that points to a path/filename in the cell phone rather than with a URI that points to a file on a remote network server. Conveniently, when a browser on such a cell phone receives the home page HTML document that points to one or more locally-stored objects, the browser would then quickly and easily retrieve the one or more objects from local storage, to facilitate presentation of the object(s) to a user.

With this arrangement, no need would exist for the cell phone browser to download the object(s). Further, no need would exist to cache the objects and consequently no risk would exist that the objects might expire and be deleted from cache. The end result would be a more seamless, quicker, and less expensive user experience.

Although storing and referencing objects locally on a cell phone or other client station is thus advantageous, the very fixed nature of the objects unfortunately presents a problem: if a need or desire arises to change any of the objects, doing so can be quite burdensome or impossible.

For instance, in the example above, if the carrier's logo changes, the logo image file stored locally on subscribers' cell phones would still be the old logo image. To force the home page to display the new logo, the carrier would need to redesign its HTML home page document to refer to a network-based image file of the new logo, which each cell phone would then need to download and perhaps cache, thus eliminating the benefit of having the logo be stored as a pictogram on the cell phone. Alternatively, the carrier could re-provision each cell phone (e.g., with a firmware update), either overthe-air or with a cable connection, in order to put the new logo image on the cell phone as a pictogram. These solutions are, unfortunately, burdensome. Therefore, an improved solution is desired.

SUMMARY

The present invention provides a mechanism for dynamically updating fixed resources on a cell phone or other client station. According to the invention, when a web server sends to a cell phone browser a markup document that references one or more locally-stored objects, a network entity will determine that the cell phone does not have the necessary objects (or object), and the network entity will responsively convey the necessary objects to the cell phone together with the markup document. Upon receipt of the markup document and the objects, the cell phone browser will then programmatically store the objects as non-cached objects in local data storage and will present the objects when rendering the markup document.

In a preferred embodiment, the network entity that will determine the cell phone does not have the referenced locally-stored objects will be a gateway or other intermediary that sits in the communication path between the web server and the cell phone. For instance, the entity can be a gateway that sits on the wireless carrier's network and through which all web traffic passes on its way to subscriber cell phones. Alternatively, the entity could be the web server itself or some other entity.

In the preferred embodiment, the gateway will include or have access to a set of device-profile data that indicates, for each cell phone, what set of objects the device has stored locally. In particular, the profile data for each cell phone can indicate an "object-set version" number, which is correlated with particular objects, such as particular versions of pictograms, music files, etc. In addition, the gateway will include or have access to the object files of each object-set version.

Further, the markup document provided by the web server will preferably be designed to include an indication of an object-set required (or desired) to be used by a browser when rendering the markup document. For instance, the markup document may include a tag (e.g., a MIME tag) that specifies the required object-set version.

When the gateway receives the markup document that is being communicated from the web server to the cell phone, the gateway will then (i) determine from the markup document what object-set version is required and (ii) determine from the cell phone's profile data what object-set version the cell phone currently possesses. The gateway will then compare those versions to determine whether the cell phone has the required object-set version. If the gateway thereby determines that the cell phone has the required object-set version, then the gateway will pass the markup document along to the cell phone as is, without further action. On the other hand, if the gateway determines that the cell phone does not have the required object-set version, then the gateway will deliver an object-set update to the cell phone together with the markup document.

The gateway can deliver an object-set update together with the markup document in various ways. In a preferred embodiment, the gateway will do so by delivering a multi-part MIME package (in the HTTP 200 OK response message) to the cell phone, with the markup document being included in the root part of the package, and each object of the object set update being included in a respective additional part of the package. For instance, if the object-set update consists of two image files, each image file can be included in binary form or Base-n (e.g., Base-64) ASCII form in a respective part of the multi-part MIME package. Preferably, each MIME part that carries an object to be stored locally in the cell phone will include a special MIME header that designates the object as one to be stored locally. For instance, a MIME header could specify content type as "jpeg image" and could further include an attribute flag (e.g., LOCALSTORE=true) that the browser would understand to mean the browser should store the provided image file in local storage as a non-cached object.

When the browser receives the multi-part MIME package in the response to the browser's content request, the browser will then programmatically detect the special MIME header for each object that is to be stored locally, and the browser will extract and store the included object in local data storage as a non-cached object. The browser will then present the newly stored objects to the extent called for when rendering the markup document.

As presently contemplated, an object-set update can be a full update or an incremental update. A full update would provide the cell phone with all objects of the required object-set version. For instance, if the object-set version consists of image files 1, 2, 3 and 4, the full update would provide the cell phone with all four of those image files. An incremental update, on the other hand, would provide the cell phone with the objects that the cell phone does not yet have. For instance, if the cell phone already has image files 1 and 2 but not image files 3 and 4, then an incremental update would provide the cell phone with just image files 3 and 4. For an incremental update, the gateway can determine which objects to provide, by comparing the objects of the cell phone's current object-set version with the objects of the required object-set version.

As an example of this process, consider the scenario described above. Assume that the gateway maintains a profile record for a given cell phone indicating that the cell phone has object-set version 1.0. (This might be the object-set that was initially provisioned on the cell phone at the time of manufacture or sale of the cell phone to a subscriber, for instance.) Further, assume that the gateway has object-set data (i) that indicates object-set version 1.0 includes the carrier's old logo image file, e.g., "logoimage1.jpg" and some other objects and (ii) that includes an instance of each object of object-set version 1.0.

When the carrier changes its logo, the carrier may then update the gateway's object-set data to additionally define a new object-set version 2.0, which (i) lists as an element of object-set version 2.0 the new logo image file, e.g., "logoimage2.jpg" and any other applicable objects, and (ii) includes an instance of each object of object-set version 2.0. Further, the carrier may revise its HTML home page document to reference a locally-stored copy of the new logo image file, logoimage2.jpg and further to indicate (with a MIME tag for instance) that the required object-set version is version 2.0. (Note that the new image file could have a different name than the old image file as in this example, or it could have the same name but be tagged with a different version identifier or date of creation, to differentiate it.)

When the web server delivers the HTML home page document to the cell phone in an HTTP 200 OK response for instance, the gateway may receive the response and (i) read the markup document and thereby determine that the required object-set version is version 2.0 and (ii) read the destination cell phone's profile data and thereby determine that the cell phone is currently equipped with object-set version 1.0. Given this discrepancy between object set versions, the gateway will then programmatically establish a multi-part MIME package that includes the markup document in a root part and that includes in one or more other parts the object(s) of object-set version 2.0 (fully or incrementally), including the new logo image file, logoimage2.jpg, tagging each to be stored locally. The gateway will then send the multi-part MIME package along as the HTTP 200 OK response to the cell phone.

Upon receipt of the multi-part MIME package, the cell phone browser will programmatically extract each provided object of object-set version 2.0 and will store each object as a non-cached object in local data storage. The browser will then render the markup document, presenting the non-cached objects to the extent the local copies are referenced by the markup document. Thus, in this example, the home page would render with the carrier's new logo.

Further, the next time the cell phone browser receives a markup document that similarly references locally-stored copies of any object-set version 2.0 objects, the browser can conveniently retrieve the non-cached objects from local data storage, rather than having to download the objects from a network server. Moreover, because the objects are stored as non-cached objects, no risk would exist that the objects would expire from cache.

These and other aspects, advantages, and alternatives will become apparent to those of ordinary skill in the art by reading the following detailed description, with reference where appropriate to the accompanying drawings. Further, it should be understood that the foregoing summary is merely exemplary and is not intended to limit the scope of the invention as claimed.

BRIEF DESCRIPTION OF THE DRAWINGS

FIG. 5 depicts device profile data referenced in accordance with the exemplary embodiment.

FIG. 9 is a listing of a pre-gateway response to a content request.

FIG. 10 is a listing of a post-gateway response to a content request, in accordance with the exemplary embodiment.

DETAILED DESCRIPTION OF AN EXEMPLARY EMBODIMENT

Figure 1:
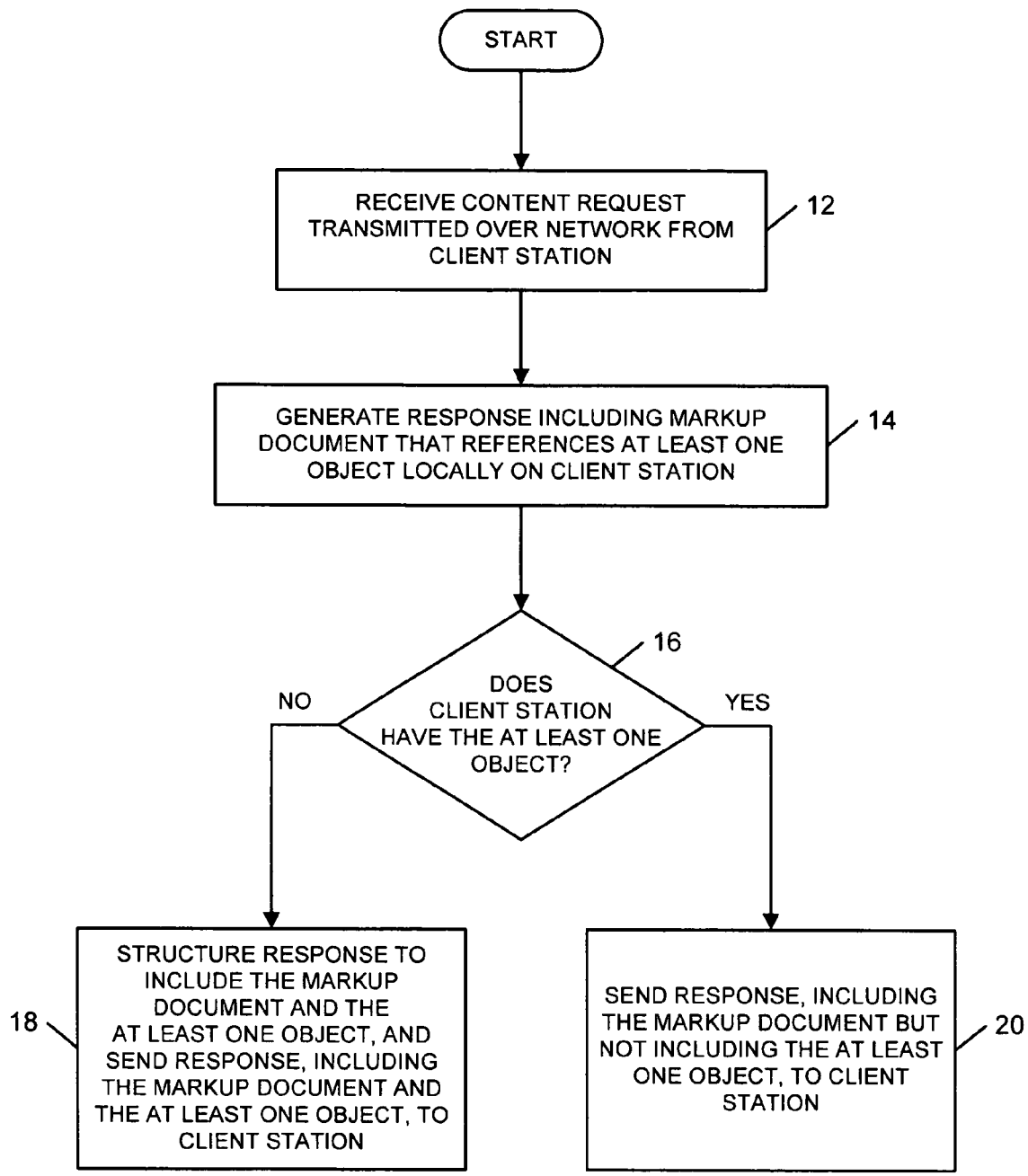
FIG. 1 is a flow chart depicting operation of an exemplary embodiment of the invention.

Referring to the drawings, FIG. 1 is a flow chart depicting a method arranged in accordance with an exemplary embodiment of the invention. As shown in FIG. 1, at block 12, the method involves receiving a content request transmitted over a network from a client station. At block 14, the method then involves generating a response to the content request, where the response includes a markup document that references at least one object at a storage location on the client station. At blocks 16-20, which may occur as part of block 14 or separate from block 14, the method involves determining whether the client station has the at least one referenced object and, if not, including the at least one referenced object together with the response. In particular, at block 16, the method involves determining whether the client station has the at least one referenced object. If the determination is that the client station does not have the at least one referenced object, then, at block 18, the method involves structuring the response (e.g., initially or as a modification) to include the markup document and the at least one referenced object, and sending the response, including the markup document and at least one referenced object, to the client station. On the other hand, if the determination is that the client station has the at least one referenced object, then, at block 20, the method involves sending the response, including the markup document but not including the at least one referenced object, to the client station.

Figure 2:
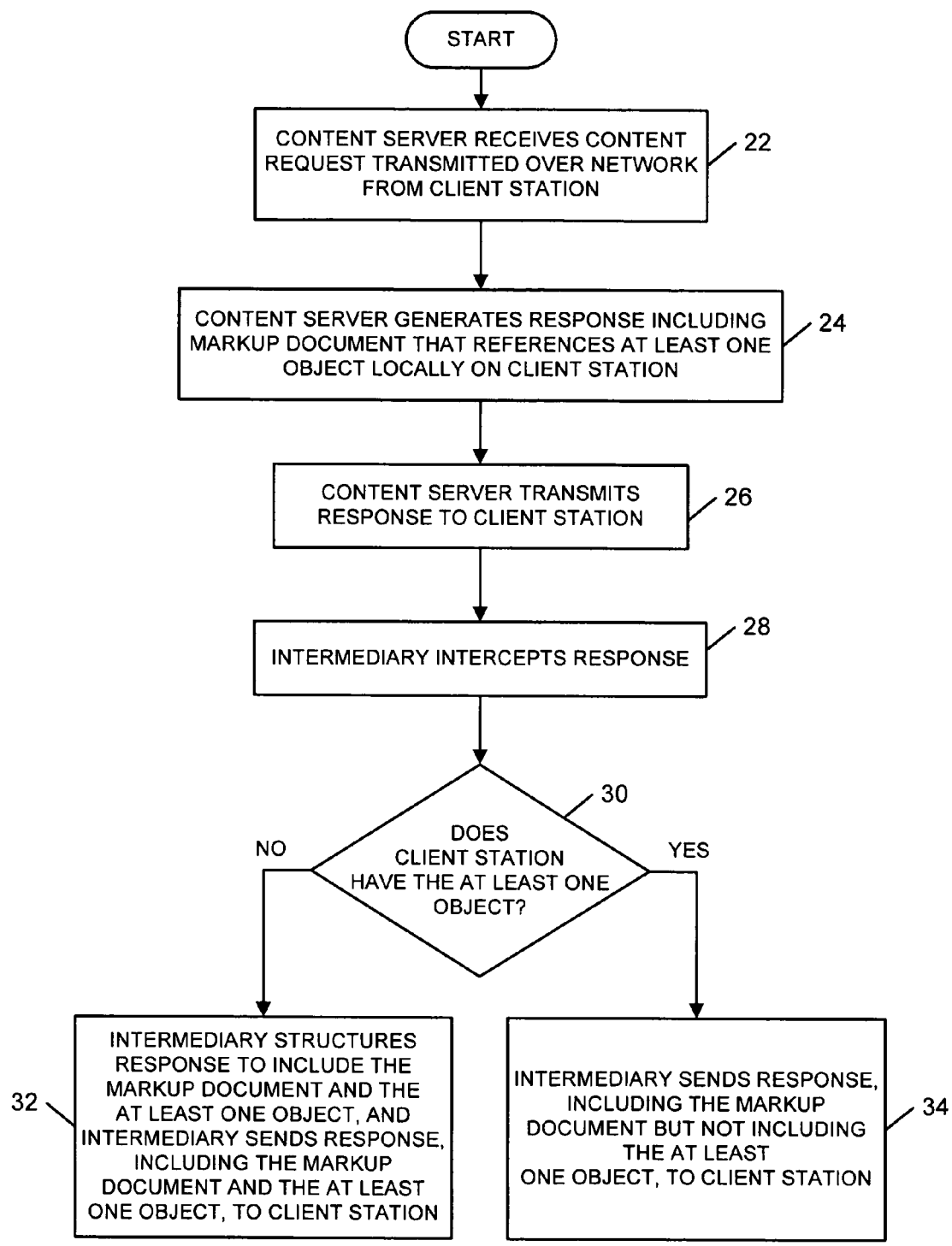
FIG. 2 is another flow chart depicting operation of the exemplary embodiment.

As noted above, this process can occur at one or more points within a network. By way of example, the process can occur entirely at a content server (such as a web server) to which the request is directed. Alternatively, in a preferred embodiment, the process can occur in part at a content server and in part at an intermediary that sits in the communication path between the content server and the client station. FIG. 2 is a flow chart depicting how the process could be arranged in that case.

As shown in FIG. 2, at block 22, a content server receives a content request transmitted over a network from a client station. At block 24, the content server generates a response to the request, including a markup document that references at least one object at a storage location on the client station. And at block 26, the content server then transmits the response over a communication path to the client station. At block 28, an intermediary sitting within the communication path then receives (e.g., intercepts) the response and, at block 30, the intermediary determines whether the client station has the at least one object. If the intermediary determines that the client station does not have the at least one object, then, at block 32, the intermediary modifies the response (e.g., produces a new version of the response) to include the markup document and the at least one object and sends the response, including the markup document and the at least one object, to the client station. On the other hand, if the intermediary determines that the client station has the at least one object, then, at block 34, the intermediary sends the response as is, without the at least one object, along to the client station.

Figure 3:
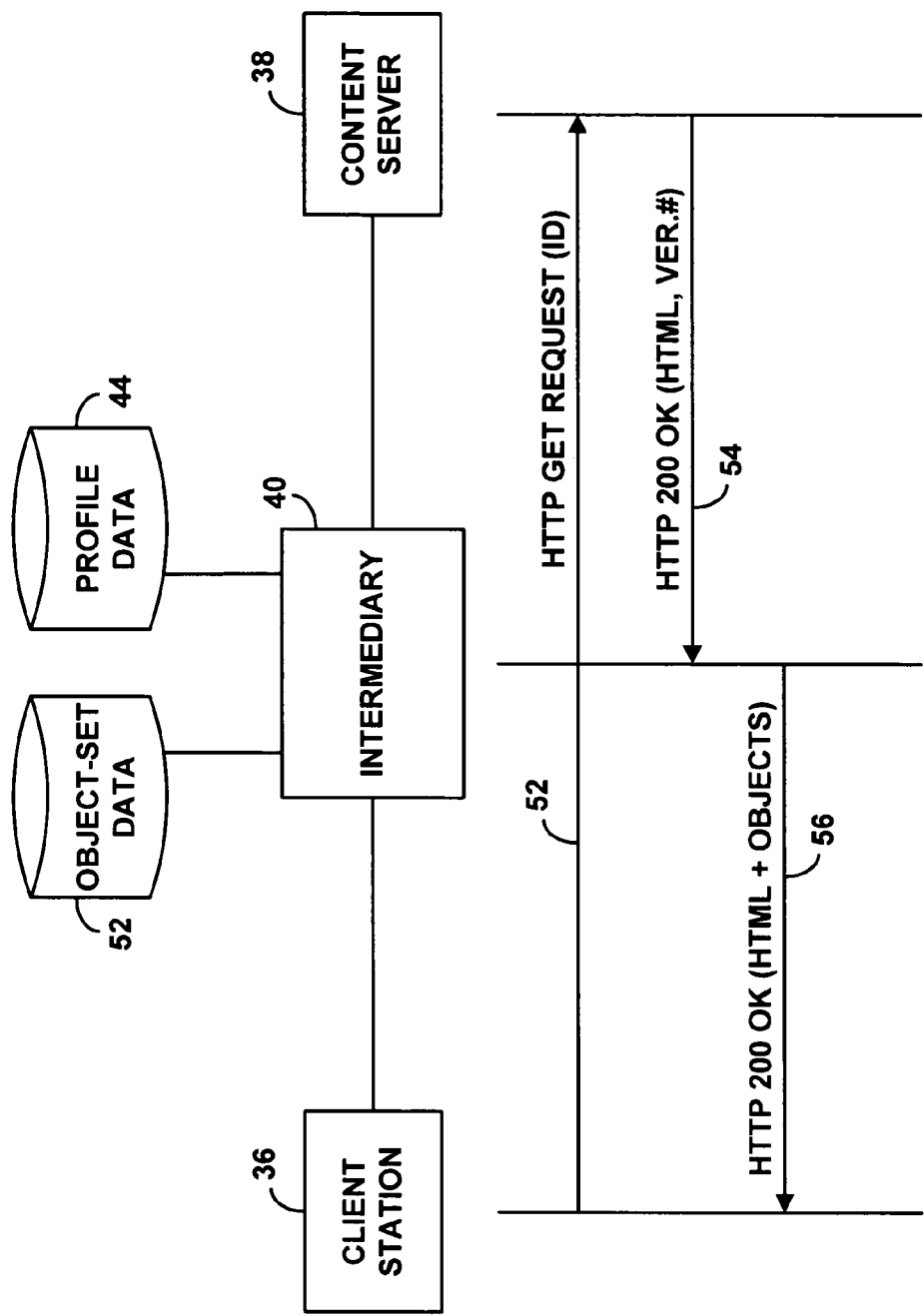
FIG. 3 is a generalized block diagram and message-flow diagram depicting network architecture and messaging in accordance with the exemplary embodiment.

Referring next to FIG. 3, a generalized block diagram is provided, depicting a network arrangement for carrying out the method of FIG. 2. As shown in FIG. 3, a communication path is provided between a client station 36 and a content server 38, and an intermediary 40 sits within the communication path. In particular, a first leg 42 of the communication path links client station 36 and intermediary 40, and a second leg 44 of the communication path links intermediary 40 and content server 38. With this arrangement, communications sent from client station 36 to content server 38 pass through intermediary 40, and communications sent from content server 38 to client station 36 similarly pass through intermediary 40. Consequently, intermediary 40 can operate on the communications, such as to modify the communications before passing them along to their intended destination.

In the preferred embodiment, intermediary 40 includes or has access to various sets of data, including object-set data 42 and profile data 44. As shown in FIG. 3, this data can be provided in data storage external to the intermediary, and the intermediary can be provided with access to the data storage. For instance, the data can be maintained by a database server, and intermediary 40 can be provided with access to the database server via a network or direct connection. Alternatively, some or all of the data can be stored directly on the intermediary.

Object-set data 42 preferably specifies various versions of object-sets and, for version, provides (i) a listing of objects included in the object-set and (ii) data defining the objects themselves. This data can be arranged in a relational database format or in another format. For instance, the data can be arranged as a table in which each record is keyed to a particular object-set version number and includes an array listing objects included in the object-set version. The array can specify each object as a pointer (e.g., path/filename) to an actual instance of the object, such as a binary representation of the image, or a Base64 ASCII representation of the object. Alternatively, the table itself can contain the actual instance of the object, or the data can be arranged in some other way altogether.

Figure 4:
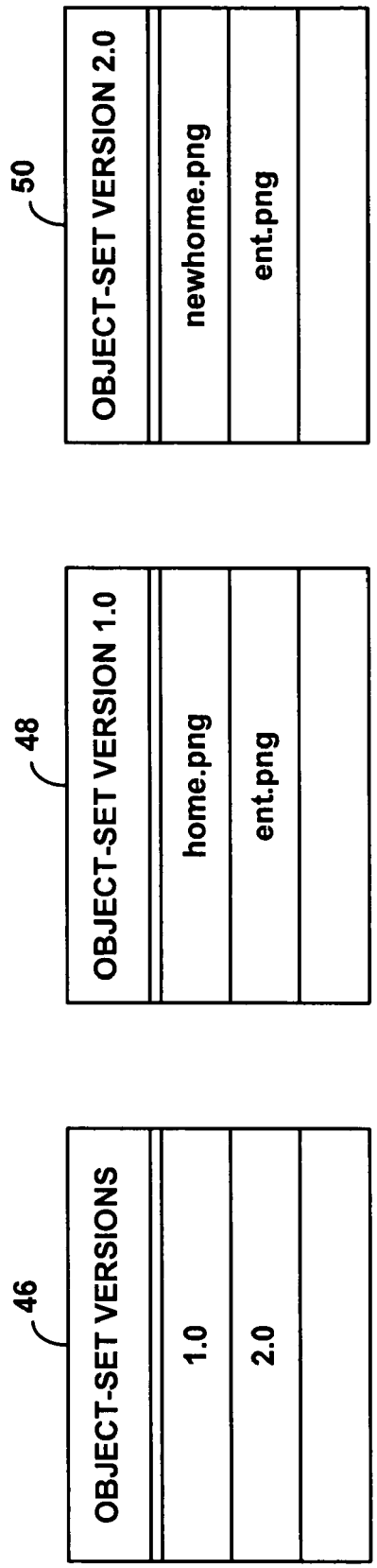
FIG. 4 depicts object-set data referenced in accordance with the exemplary embodiment.

FIG. 4 depicts an example of object-set data 42. For ease of illustration, the object-set data is shown as three tables 46, 48, 50. Table 46 provides a listing of known object-set versions, including, for simplicity, object-set version 1.0 and object set version 2.0. Table 48 lists the objects of object-set version 1.0 by object name, and table 50 lists the objects of object-set version 2.0 by object name. The object names listed in tables 48 and 50 may be the names of files stored as part of object-set data 42, for instance. By way of example, table 48 indicates that object-set version 1.0 consists of two pictograms, "home.png" and "ent.png", and table 50 indicates that object-set version 2.0 consists of two pictograms, "newhome.png" and "ent.png". Thus, given an object-set version, it is possible by reference to object-set data 42 (i) to determine what objects are included in the object-set and (ii) to obtain actual instances of the objects themselves.

Figure 5:
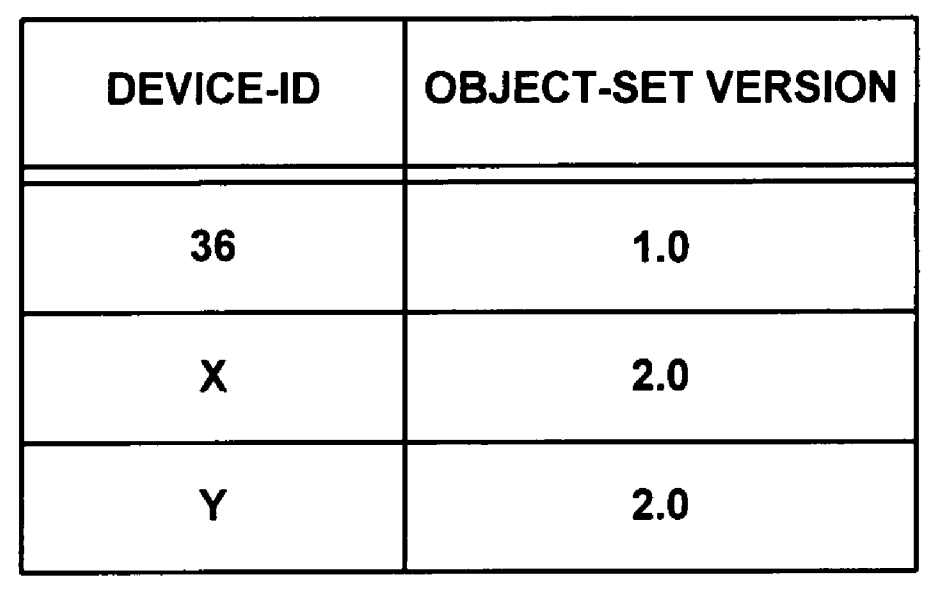

FIG. 5 next depicts an example of profile data 44. For ease of illustration, the profile data is shown as one table having two fields, a "device-ID" field and a "current object-set" field. Each record of the profile data table is keyed to a device-ID of a client station and specifies the object-set version currently stored locally on the client station. By way of example, the profile data table specifies that client station 36 contains object-set version 1.0, which means that client station 36 has the home.png and ent.png objects stored locally. Further, the profile data table specifies that client stations X and Y (not shown) each contain object-set version 2.0. By reference to this table, it is thus possible to determine what object-set version is currently stored locally on the client station.

Note that the object-set data 42 and profile data 44 can be provisioned in any of a variety of ways. Both sets of data, for instance, can be provisioned through manual data entry by a technician operating a conventional or specialized database program. Object-set data 42 may be updated each time a desire arises to efficiently serve content that references a new set of objects. Profile data 44 may be updated each time a client station is provisioned with a new set of objects.

For instance, a newly issued/manufactured client station may be provisioned with object-set version 1.0, meaning that the client station initially has copies of the pictograms "home.png" and "ent.png" stored locally as non-cached objects. At that point, profile data 44 would indicate that the client station has object-set version 1.0. In turn, the client station may be updated or re-provisioned to have object-set version 2.0, meaning that the client station has copies of the pictograms "newhome.png" and "ent.png". At that point, profile data 44 would then indicate that the client station has object-set version 2.0. In the preferred embodiment, profile data 44 will indicate the latest object-set version that the client station has, even if the client station may still maintain files of one or more earlier object-set versions as well.

Turning back to FIG. 3, a message-flow diagram is provided to illustrate an example of how the invention can operate in practice. As shown in the diagram, at step 52, client station 36 first sends a content request to content server 38. In this example, the content request is an HTTP GET request, seeking content from a particular URL hosted by the content server 38, however, the request could equally take some other form. In any event, the request is conventionally routed to content server 38 for handling.

In a preferred embodiment, the content request carries an identifier of client station 36 or an identifier that can be used to determine an identifier of client station 36. For instance, the request may carry a device-specific network-access-identifier (NAI) in a username field of the URL. In addition, the request could carry an indication of the object-set version that is currently stored on the client station 36. For instance, assuming the client station 36 has object-set version 1.0, the version number could be set forth in a query parameter in the URL as "obj-set-ver=1.0" or perhaps as a tag within the body of the GET request. (As will described below, the device identifier may be sufficient basis to determine the client station's current object-set version, by reference to profile data 44. Alternatively, however, the client station could specify its object-set version number in its content request or in some other manner.)

At step 54 in FIG. 3, content server 38 next generates a response message containing a markup document that defines the requested content. Conventionally, the markup document may include text, object-references, and formatting/rendering instructions, among other elements. In the preferred embodiment, the markup document will include one or more object references that point to objects presumed to be stored locally on the requesting client station (rather than being stored at network locations from which the client station would need to download the objects). Such local object references might take the form of reference tags keyed to local paths and filenames, for instance.

Further, in the preferred embodiment, the response will include an indication of an object-set version number that should be used to render the markup. For instance, if the markup document includes references to objects of object-set version 1.0, then the response should indicate object-set version 1.0. Whereas, if the markup document includes references to objects of object-set version 2.0, then the response should indicate object-set version 2.0. The object-set version number can be set forth in any predefined way within the response. By way of example, the object-set version number can be set forth as a predefined tag value or attribute value in the HTML document.

In the example of FIG. 3, the response is shown to be an HTTP 200 OK response that carries an HTML markup document ("HTML") and an object-set version number ("VER#"). It should be understood, however, that the response can take other forms as well. For instance, the response can be another HTTP 200 series message (other than an "OK"), or another sort of message altogether.

In accordance with the exemplary embodiment, when intermediary 40 receives the response that is being transmitted from content server 38 to client station 36, intermediary 40 will pause transmission of the response to determine whether client station 36 has the object-set version required to render the markup document provided in the response. To do so, (i) the intermediary will reference profile data 44 to determine what object-set version the client station 36 has (unless the version was specified in the content request), (ii) the intermediary will reference the response to determine what object-set version is required for rendering the markup document, and (iii) the intermediary will determine whether the those object-set versions match.

If the object-set versions match, i.e., the client station 36 has the object-set version required to render the markup document provided in the response, then the intermediary will simply send the response along as is to the client station 36. On the other hand, if the object-set versions do not match, i.e., the client station 36 does not have the object-set version required to render the markup document provided in the response, then the intermediary will re-structure the response so as to include the markup document and an object-set update comprising one or more objects necessary to give the client station 36 the required object-set, and, at step 56, the intermediary will send the re-structured response along to the client station 36.

To determine which objects to provide to the client station in the re-structured response, the intermediary 40 may refer to the object-set data 42. As noted above, the object-set update can be an incremental update or a full update. To provide an incremental update, the intermediary can determine from object-set data 42 which object(s) of the required object-set version are not already included in the object-set version on the client station 36, and the intermediary can provide just those objects to the client station. To provide a full update, the intermediary can provide client station with all objects of the required object set version, regardless of whether the client station's object-set version already includes one or more of the same objects. In either case, once the intermediary provides the client station with an object-set update, the intermediary preferably revises the profile data 44 to indicate the new object-set version that the client station now has (or that the client station is receiving).

As noted above, the intermediary may structure the response as a multi-part MIME message, in which a main part contains the markup document that was provided by the content server 38, and in which one or more other parts contain the object(s) of the object-set update. Preferably, the intermediary would include a special tag with each part that contains an object of the object-set update, to indicate to the client station 36 that the client station 36 should extract the object and store the object locally as a non-cached object. For instance, the intermediary can include a special "LOCAL-STORE" MIME tag for this purpose. Further, for added security, the intermediary can include an encrypted value with the tag, which the client station would have to decrypt and validate to confirm that the provided object is legitimate.

In the exemplary embodiment, once the client station 36 receives the re-structured response message carrying the markup document and the one or more objects of an object-set update, the client station 36 will programmatically extract each provided object from the response message and store it as a respective non-cached object in local data storage. Further, the client station will render the markup document, including presenting one or more of the provided objects to a user.

Figure 6:
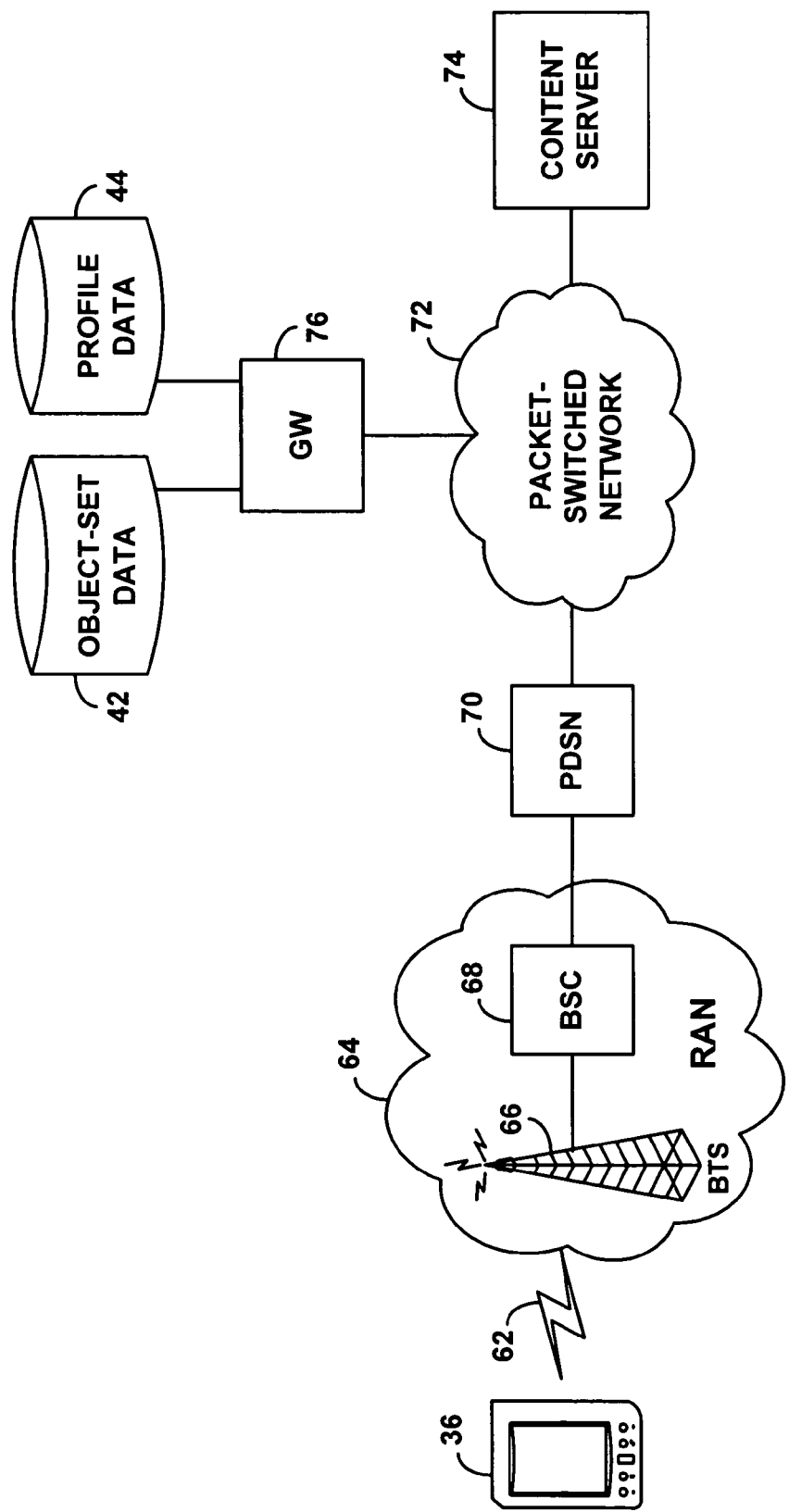
FIG. 6 is a block diagram depicting a wireless packet-data communication system in which the exemplary embodiment can be employed.

The network arrangement shown in FIG. 3 is generally representative of how the invention can be carried out in practice. Variations are possible, however. Further, the specific implementations are possible. In a preferred embodiment, for instance, the invention can be implemented in a wireless packet-data communication system, where the intermediary is a gateway sitting on a wireless carrier's core packet network. FIG. 6 depicts such an arrangement by way of example.

As shown in FIG. 6, the client station 36 is a data-capable wireless communication device (WCD), such as a cell phone, personal digital assistant (PDA), or other wirelessly equipped computing device. As shown, the WCD 36 communicates over a radio frequency air interface 62 with a radio access network (RAN) 64. The RAN 64 includes a base transceiver station (BTD) 66, coupled with a base station controller (BSC) 68. The BSC, in turn, is coupled with a packet data serving node (PDSN) 70 that provides connectivity with a packet-switched network 72. Packet-switched network 72 may comprise a wireless carrier's core packet network and may further comprise the public packet network (the Internet). Packet-switched network 72 in turn provides a connection with a content server 74. Thus, content server 74 may sit on the carrier's core network or at a point beyond the core network, e.g., on the Internet.

Also shown sitting as a node on packet-switched network 72 is a gateway 76, through which packet-data traffic passes on its way between WCD 36 and content server 74. Gateway 76, for instance, may be a WAP gateway or other gateway used for managing packet-data communications by subscribers to the wireless carrier's service. In practice, packet-data can be made to pass through gateway 76 by having WCD 36 programmed to use gateway 76 as a proxy server, and/or by having PDSN 70 route all outgoing packet-data to gateway 76 as a proxy server. As shown, gateway 76 includes or has access to object-set data 42 and profile data 44. Thus, gateway may function as intermediary 40 as described above.

Figure 7:
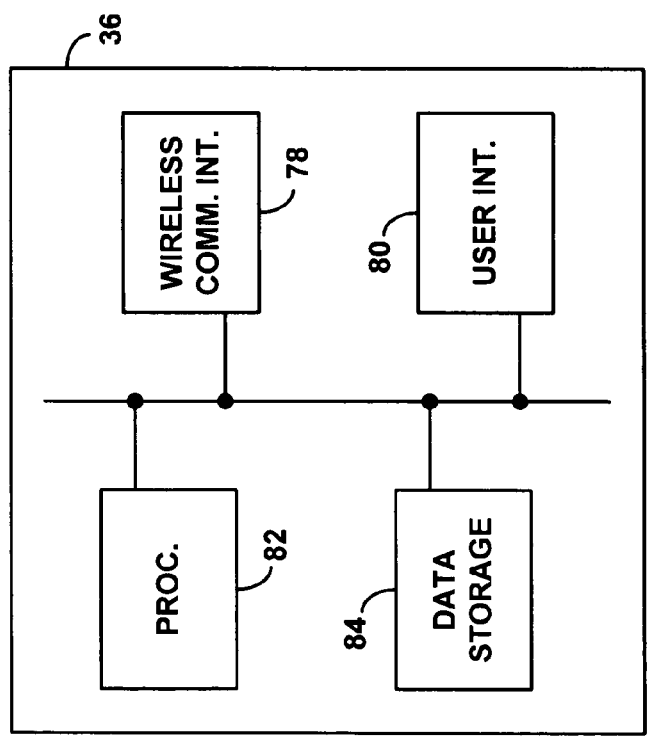
FIG. 7 is a block diagram of a wireless communication device operable in the arrangement of FIG. 6.

FIG. 7 next provides a block diagram showing functional components of an example WCD 36 arranged to operate in accordance with the exemplary embodiment. As shown in FIG. 7, the example WCD includes a wireless communication interface 78, a user interface 80, a processor 82, and data storage 84, coupled together by a system bus or other mechanism 86.

Wireless communication interface 78 functions to provide wireless connectivity with RAN 64. As such, for instance, wireless communication interface 78 may comprise a chipset such as an MSM-series chipset made by Qualcomm, an antenna, and accompanying logic for acquiring wireless packet-data connectivity and facilitating wireless packet-data communications. Data communications over the air interface 62 could comply with any of a variety of well known protocols, such a CDMA2000™, TDMA, or GSM, for instance.

User interface 80 functions to provide for interaction with a user and preferably includes a display screen and user input mechanism such as a keypad or touch-screen. Through the user-interface, a user can invoke a browser function and direct the WCD to send a content request. Further, the display is preferably suitable for presenting rendered web content, such as graphics and text.

Processor 82 comprises one or more processing elements (such as general purpose and/or dedicated processors). Data storage 84, in turn, comprises volatile and/or non-volatile storage and may be integrated in whole or in part with processor 82.

In the preferred embodiment, data storage 84 includes program logic (e.g., machine language instructions) executable by processor 82 to carry out various functions described herein. For instance, the program logic preferably defines a web browser, such as the OpenWave Mobile Browser, arranged to generate and send content requests, and to receive and render resulting responses. Preferably, the browser will include additional program logic, in accordance with the invention, to detect one or more specially marked objects provided in the response and to responsively store each object locally as a non-cached object. For instance, the browser may be arranged to detect a "LOCALSTORE" tag with each object, to validate the object if necessary, and to responsively store the object locally as a non-cached object. Further, the browser is preferably arranged to include a device identifier with each content request that it sends (or the RAN 64, PDSN 70, or gateway 76 may be arranged to determine the identifier) and perhaps to include in each content request an indication of the client device's current object-set version.

Data storage 84 also includes preferably houses one or more non-cached objects cooperatively defining an object-set of a particular version, and data storage 84 may include an indication of the object-set version that it houses. For instance, data storage 84 may contain the pictograms "home.png" and "ent.png" as the elements of object-set version 1.0. Preferably, data-storage 84 will include a defined file structure, and these non-cached objects will be stored in a set folder or directory of the file structure.

Figure 8:
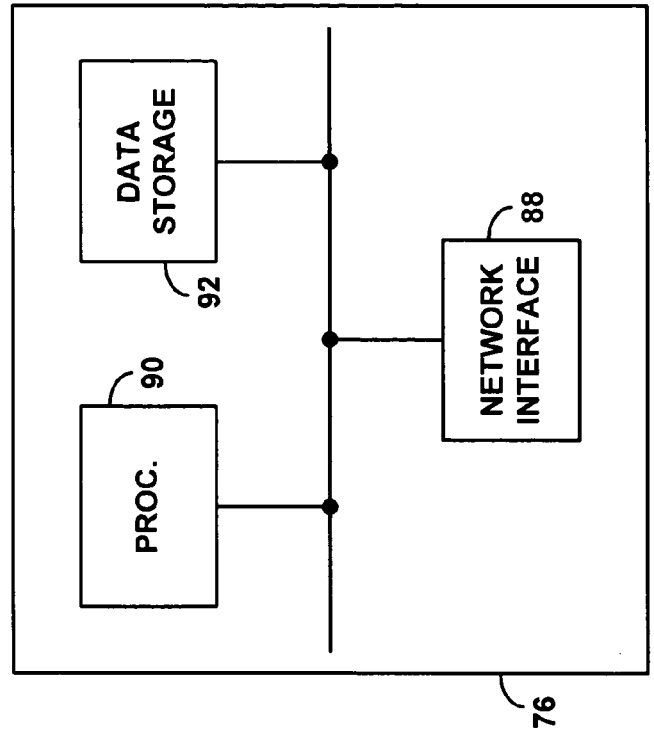
FIG. 8 is a block diagram of a gateway operable in the arrangement of FIG. 6.

FIG. 8 next provides a block diagram of an example gateway 76 arranged to operate in accordance with the exemplary embodiment. Gateway 76 includes a network interface 88, a processor 90, and data storage 92. Network interface 88 provides for connectivity with packet-switched network 72 and may therefore comprise an Ethernet network interface module or the like. Processor 90 comprises one or more processing elements (such as general purpose and/or dedicated processors), and data storage 92 comprises volatile and/or non-volatile storage, which may be integrated in whole or in part with processor 90.

In the exemplary embodiment, data storage 92 includes program instructions executable by processor 90 to carry out various functions described herein. For example, the program instructions are preferably executable by processor 90 (i) to intercept a response that is being transmitted from content server 74 to WCD 36, where the response contains a markup document that references one or more objects presumed to be stored locally on the WCD, (ii) to determine whether the WCD has the object-set version required to render the markup document, (iii) if the determination is that the WCD does not have the required object-set version, to send an object-set update to the WCD together with the markup document, and (iv) if the determination is that the WCD does have the required object-set version, to send the response as-is to the WCD.

Referring next to FIGS. 9 and 10, example response messages are shown, to further illustrate how the exemplary embodiment would operate in practice within the arrangement of FIG. 6. FIG. 9 first illustrates an HTTP 200 OK response message ("pre-gateway response") that content server 74 transmits to WCD 36, and FIG. 10 then illustrates a modified HTTP 200 OK response ("post-gateway response") that gateway sends to WCD 36 in place of the response provided by content server 74 in order to deliver an object-set update with the response.

FIG. 9 shows at its top an HTTP GET request transmitted by WCD 36, which is directed to the Sprint PCS home page. This request would carry with it or otherwise be associated with an identifier such as an NAI unique to WCD 36, and so the response would be correlated with that device identifier. Following the GET request, FIG. 9 presents the pre-gateway response, which is an HTTP 200 OK message generated by content server 74.

As shown, the GET request includes an "x-wap-pict-version" header field, which indicates a value of "2.0". This is the object-set version indication, i.e., the indication of object-set version required for rendering the markup document that follows. In this case, the markup document that follows includes references to two locally stored pictograms, "newhome.png" and "ent.png", which, according to FIG. 4, are the objects of object-set version 2.0. Thus, WCD 36 would need these objects in order to be able to render the markup.

In operation, gateway 76 would receive this pre-gateway response message and would then determine whether WCD 36 has the required object-set version. In this case, referring to the profile data 44 of FIG. 5, the gateway would determine that WCD 36 has object-set version 1.0, and, referring to the "x-wap-pict-version" header of the pre-gateway response, the gateway would determine that the required object-set version is version 2.0. Thus, the gateway will responsively re-structure the response to include both the markup document and an object-set update, i.e., to produce a post-gateway response.

As shown in FIG. 10, the post-gateway response is a multi-part MIME message that carries the object-set update in one or more parts. (Note that the pre-gateway response can also be a multi-part MIME message, but the post-gateway response would differ in that it would selectively provide or not provide referenced object(s) depending on whether the WCD already has the referenced object(s).) In this case, the object-set update is an incremental update. In particular, given that the only difference between object-set version 1.0 and object-set version 2.0 is the inclusion of the "newhome.png" pictogram instead of the "home.png" picgtogram, the object-set update provides WCD 36 with just the "newhome.png" pictogram.

The multi-part MIME message of the post-gateway response includes a "Content-Type" HTTP header field, which specifies a MIME boundary value used to delimit parts of the multi-part MIME message. Following that are two parts. A first part is the markup document that had been provided by the pre-gateway response. And a second part provides the "newhome.png" pictogram. In this case, the pictogram is provided with Base64 ASCII encoding. Further, an "x-content-localstore" MIME header specifies a value (listed only as "<value>") in the figure, which may be an encrypted secret value that the WCD browser will programmatically decrypt and validate in order to ensure the pictogram is legitimate, and in response to which the WCD browser will store the provided pictogram locally as non-cached object. The label "pict:///custom/newhome.png" is a label to which the main markup document refers and may further specify where the pictogram should be stored in data storage 84 of WCD 36.

When the WCD browser receives this post-gateway response, the browser would thus detect and validate the "x-content-local" header value in the second part of the multi-part MIME message and would responsively store the "newhome.png" pictogram locally as a non-cached object. Further, the browser would render the markup document provided in the first part, including presenting the two referenced pictograms, one of which the WCD had stored already and the other of which the WCD just received in the post-gateway response.

An exemplary embodiment of the present invention has been described above. Those skilled in the art will understand, however, that changes and modifications may be made to this embodiment without departing from the true scope and spirit of the present invention, which is defined by the claims.

We claim:

1. A system comprising:
   an intermediary sitting within a network communication path between a web server and a client station, wherein the intermediary has access to device profile data and object-set data, the device profile data indicating what object-set version the client station has stored in local data storage, and the object-set data defining object contents of each of a plurality of object-set versions, wherein the intermediary is arranged to receive a markup document during transmission of the markup document from the web server to the client station, the markup document being provided in response to a content request from the client station, and the markup document including an indication that rendering the markup document requires use of a given object-set version, and wherein the intermediary is arranged to reference the device profile data and the indication in the markup document, to thereby make a determination of whether the client station has the given object-set version stored in local data storage, and (i) if the determination is that the client station has the given object-set version stored in local data storage, then to send the markup document to the client station without an object-set update and (ii) if the determination is that the client station does not have the given object-set version stored in local data storage, then to send an object-set update together with the markup document to the client station, the object-set update providing the client station with at least one object of the given object-set version.

2. The system of claim 1, wherein the intermediary comprises a gateway.

3. The system of claim 1, wherein the client station is a cell phone.

4. The system of claim 1, wherein the at least one object comprises a pictogram.

5. The system of claim 1, wherein the at least one object comprises an object selected from the group consisting of an image file, a music file, and a multimedia file.

6. The system of claim 1, wherein the client station is a wireless communication device served by a carrier, and wherein the at least one object comprises an image file for display on a home page of a website hosted by the carrier.

7. The system of claim 1, wherein sending the object-set update together with the markup document to the client station comprising sending a multi-part MIME package that includes the markup document in at least one part and that includes the at least one object in at least one other part.

* * * * *